United States Patent
Hosoi et al.

(10) Patent No.: US 9,884,958 B2
(45) Date of Patent: Feb. 6, 2018

(54) PROPYLENE-BASED BLOCK COPOLYMER

(71) Applicant: JAPAN POLYPROPYLENE CORPORATION, Chiyoda-ku (JP)

(72) Inventors: Tomohiro Hosoi, Mie (JP); Shigeo Mizukami, Mie (JP); Masahiro Nagata, Mie (JP); Kouichi Nakayama, Mie (JP); Yuji Ryosho, Mie (JP)

(73) Assignee: JAPAN POLYPROPYLENE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/899,763

(22) PCT Filed: Jun. 19, 2014

(86) PCT No.: PCT/JP2014/066361
§ 371 (c)(1),
(2) Date: Dec. 18, 2015

(87) PCT Pub. No.: WO2014/203981
PCT Pub. Date: Dec. 24, 2014

(65) Prior Publication Data
US 2016/0137831 A1 May 19, 2016

(30) Foreign Application Priority Data

Jun. 20, 2013 (JP) .................. 2013-129827

(51) Int. Cl.
| C08L 53/00 | (2006.01) |
| C08F 297/08 | (2006.01) |
| B29C 45/00 | (2006.01) |
| C08F 299/02 | (2006.01) |
| C08L 23/14 | (2006.01) |
| B29K 23/00 | (2006.01) |

(52) U.S. Cl.
CPC .......... C08L 53/00 (2013.01); B29C 45/0001 (2013.01); C08F 297/083 (2013.01); C08F 299/022 (2013.01); C08L 23/142 (2013.01); B29K 2023/14 (2013.01); C08L 2205/025 (2013.01); C08L 2205/06 (2013.01)

(58) Field of Classification Search
CPC ...... C08L 53/00; C08L 23/10; C08L 2205/06; B29C 45/0001; C08F 299/022; C08F 297/083; B29K 2023/14
See application file for complete search history.

(56) References Cited

U.S. PATENT DOCUMENTS

| 2002/0035209 A1 | 3/2002 | Kanzaki et al. |
| 2004/0049045 A1 | 3/2004 | Hashimoto et al. |
| 2005/0154131 A1 | 7/2005 | Kanzaki et al. |
| 2008/0306118 A1 | 12/2008 | Hashimoto et al. |
| 2009/0131576 A1* | 5/2009 | Zanka ............... C08F 297/08 524/505 |
| 2009/0292060 A1 | 11/2009 | Suzuki et al. |
| 2011/0086970 A1 | 4/2011 | Grein et al. |
| 2011/0172353 A1 | 7/2011 | Matsunaga et al. |
| 2014/0045994 A1 | 2/2014 | Grein et al. |

FOREIGN PATENT DOCUMENTS

| CN | 101103054 A | 1/2008 |
| CN | 101405341 A | 4/2009 |
| EP | 0 942 021 A1 | 9/1999 |
| EP | 2 330 139 A1 | 6/2011 |
| JP | 7-286022 A | 10/1995 |
| JP | 9-176406 A | 7/1997 |
| JP | 11-80298 A | 3/1999 |
| JP | 11-322871 A | 11/1999 |
| JP | 2000-226478 A | 8/2000 |
| JP | 2002-12734 A | 1/2002 |
| JP | 2004-18647 A | 1/2004 |
| JP | 2005-146160 A | 6/2005 |
| JP | 2006-219667 A | 8/2006 |
| JP | 2009-7394 A | 1/2009 |
| WO | WO 2009-153213 A1 | 12/2009 |

OTHER PUBLICATIONS

Madkour, T.M., et al; Science and Technology of Polymers and Advanced Materials, 1998, p. 125-139.*
International Search Report dated Oct. 7, 2014 in PCT/JP2014/066361 (English Translation only).
Combined Chinese Office Action and Search Report dated Jan. 3, 2017 in Chinese Patent Application No. 201480035181.X (with English language translation and English translation of categories of cited documents).

* cited by examiner

Primary Examiner — Robert Jones, Jr.
(74) Attorney, Agent, or Firm — Oblon, McClelland, Maier & Neustadt, L.L.P.

(57) ABSTRACT

An object of the present invention is to prevent an occurrence of flow-mark molding defects to improve an appearance of molded articles, and as a means for achieving the object, a propylene-based block copolymer is used as an appearance improver, the copolymer comprising 80 to 60% by weight of crystalline propylene polymer portion which has an intrinsic viscosity [η]p of 0.90 dL/g or less and 20 to 40% by weight of propylene/ethylene random copolymer portion which has an ethylene content of 35 to 50% by weight and an intrinsic viscosity [η]c of 7.0 dL/g or higher ([η]c/[η]p being 7.5 to 30), in which the propylene-based block copolymer has a MFR of 10 to 50 g/10 min.

5 Claims, No Drawings

PROPYLENE-BASED BLOCK COPOLYMER

CROSS-REFERENCE TO RELATED APPLICATIONS

This application is a National Stage of PCT/JP2014/066361, which was filed on Jun. 19, 2014. This application is based upon and claims the benefit of priority to Japanese Application No. 2013-129827, which was filed on Jun. 20, 2013.

TECHNICAL FIELD

The present invention relates to a propylene-based block copolymer. More particularly, the invention relates to a propylene-based block copolymer which, when incorporated, can improve molding defects such as flow marks to improve the appearance of molded articles.

BACKGROUND ART

Polypropylene-based resins are lightweight and have excellent recyclability and, hence, there is an increasing demand thereof to automotive components. Specifically, polypropylene resin compositions obtained by incorporating an elastomer such as an ethylene/propylene copolymer or an ethylene/butene copolymer and an inorganic filler such as talc into a crystalline polypropylene resin are in use as the polypropylene-based resins. It has been proposed to improve moldability, mechanical properties, appearance, etc. by suitably selecting a crystalline polypropylene resin, an elastomer, and an inorganic filler in accordance with purposes.

Recently, there is a desire for a polypropylene-based resin from which molded articles having a down gauging can be molded in a shorter molding time, from the standpoint of more efficiently producing automotive components reduced in weight. However, such molded articles have a problem in that appearance defects such as flow marks (the pattern of tiger stripes appearing in molding surface) are prone to occur. In particular, in components designed to have an uncoated portion exposed outward such as a bumper, there has been a trouble that such flow marks impair the design attractiveness of the merchandise.

Techniques for improving such flow marks are disclosed, for example, in patent documents 1 to 4.

Patent document 1, which is to provide a polypropylene-based resin composition that is less apt to develop flow marks or gels and attains an excellent appearance, discloses a polypropylene-based resin composition obtained by blending, in a specific proportion, a polypropylene-based resin (A) having a propylene homopolymer portion having an intrinsic viscosity of 1.3 dL/g or less and a propylene/ethylene random copolymer portion having an intrinsic viscosity of 3.0 dL/g or less with a propylene/ethylene block copolymer (B) having a propylene/ethylene random copolymer portion having an intrinsic viscosity of 8.0 to 15 dL/g.

Patent document 2 discloses a process for producing a propylene/ethylene block copolymer which includes a propylene polymer having a MFR of 100 to 1,000 g/10 min and in which a propylene/ethylene copolymer accounts for 5 to 10 wt % of the whole weight.

Patent document 3 discloses a polypropylene-based resin composition which shows satisfactory moldability in injection molding, is excellent in terms of flow mark characteristics, and is suitable for injection-molded articles including automotive exterior components. It has been ascertained that by enlarging the difference in viscosity between the propylene homopolymer and the propylene/ethylene random copolymer, the composition is rendered usable as an additive ingredient which is more effective in improving flow marks.

Patent document 4, which is to provide a polypropylene-based resin composition that attains a satisfactory appearance and has excellent moldability, discloses use of a moldability modifier which includes a propylene/ethylene block copolymer having specific properties. Specifically, document 4 discloses a propylene/ethylene block copolymer in which the propylene homopolymer portion (crystalline component) has a MFR of 500 g/10 min or higher and which as a whole has a MFR of 100 g/10 min or higher and a die swell ratio of 1.2 to 2.5.

These techniques each relate to a propylene/ethylene block copolymer which includes a low-viscosity high-MFR component as a propylene homopolymer portion and a high-viscosity component as a propylene/ethylene random copolymer portion. It is thought that both the improvement in flowability due to a reduction in shear stress attributable to the high-MFR propylene homopolymer portion and the stabilization of flow due to an increase in normal stress attributable to the high-viscosity propylene/ethylene random copolymer portion contribute to the improvement of flow marks in those techniques.

However, it is necessary in those techniques that for controlling the appearance of molded articles by incorporating the propylene/ethylene block copolymer as an additive ingredient, the copolymer should be incorporated in a large amount. There has hence been a problem in that the incorporation thereof undesirably changes some properties of the polypropylene-based resin composition which are desired to remain unchanged.

Propylene/ethylene block copolymers which, when used as additive ingredients, are capable of improving appearance with a small addition amount are disclosed, for example, in patent documents 5 and 6.

Patent document 5 discloses a propylene-based polymer configured of 51 to 75% by weight of propylene/ethylene random copolymer component (A) having an intrinsic viscosity of 5 dL/g or higher and an ethylene content of 8% by weight or higher but less than 20% by weight and 25 to 49% by weight of propylene-based polymer component (B) having an intrinsic viscosity of 1.2 dL/g or less and obtained by polymerizing monomers consisting mainly of propylene.

Patent document 6 discloses a propylene-based block copolymer which is configured of a crystalline propylene polymer portion having an intrinsic viscosity [η]homo of 1.2 dL/g or less and a propylene/ethylene random copolymer portion that has an ethylene content of 30 to 70% by weight and an intrinsic viscosity [η]copoly of 2.5 to 7.0 dL/g and that accounts for 40 to 80% by weight of the whole, and which as a whole has a MFR of 0.1 to 10 g/10 min and a value of [η]copoly/[η]homo of 2.5 to 10.

However, these techniques have had a problem in that incorporation of the propylene/ethylene block copolymer as an additive ingredient results in an excessive decrease in the flowability of the polypropylene-based resin composition.

PRIOR ART DOCUMENTS

Patent Documents

Patent Document 1: JP-A-2002-12734
Patent Document 2: JP-A-11-80298
Patent Document 3: JP-A-2009-007394
Patent Document 4: JP-A-2004-18647

Patent Document 5: JP-A-2005-146160
Patent Document 6: JP-A-2006-219667

SUMMARY OF THE INVENTION

Problem that the Invention is to Solve

An object of the invention, in view of the prior-art techniques and problems thereof described above, is to provide a propylene-based block copolymer that can be used as an appearance improver for polypropylene-based resins which, when incorporated, is capable of improving flow-mark molding defects (appearance defects).

Means for Solving the Problem

The present inventors diligently made investigations in order to overcome the problem and, as a result, have discovered that a propylene-based block copolymer having specific properties can improve the molding appearance and moldability of polypropylene-based resins when incorporated thereinto even in a small amount. The present invention has been thus accomplished.

Namely, an aspect of the present invention is a propylene-based block copolymer which comprises: 80 to 60% by weight of crystalline propylene polymer portion; and 20 to 40% by weight of propylene/ethylene random copolymer portion, and which satisfies the following requirements (a) to (e):
(a) the crystalline propylene polymer portion has an intrinsic viscosity $[\eta]p$ of 0.90 dL/g or less,
(b) the propylene/ethylene random copolymer portion has an intrinsic viscosity $[\eta]c$ of 7.0 dL/g or higher,
(c) the propylene/ethylene random copolymer portion has an ethylene content of 35 to 50% by weight,
(d) the ratio ($[\eta]c/[\eta]p$) of the intrinsic viscosity $[\eta]c$ of the propylene/ethylene random copolymer portion to the intrinsic viscosity $[\eta]p$ of the crystalline propylene polymer portion is 7.5 to 30, and
(e) the propylene-based block copolymer a MFR of 10 to 50 g/10 min Another aspect of the present invention is a polypropylene-based resin composition obtained by mixing 100 parts by weight of a polypropylene-based resin material to be modified, with 2 to 30 parts by weight of the propylene-based block copolymer above.

Still another aspect of the present invention is the polypropylene-based resin composition above, wherein the polypropylene-based resin material to be modified comprises (A) 40 to 98% by weight of propylene/ethylene block copolymer, (B) 1 to 35% by weight of inorganic filler, and (C) 1 to 30% by weight of elastomer.

A further aspect of the present invention is a molded object obtained by injection-molding the polypropylene-based resin composition above.

Effects of the Invention

The propylene-based block copolymer of the invention has an exceedingly large value of the ratio ($[\eta]c/[\eta]p$) of the intrinsic viscosity $[\eta]c$ of the propylene/ethylene copolymer portion to the intrinsic viscosity $[\eta]p$ of the crystalline propylene polymer portion, includes the propylene/ethylene random copolymer portion, which has a high intrinsic viscosity $[\eta]c$, in a high content, and can remarkably improve appearance defects such as flow marks in molded articles when incorporated even in a small amount. Consequently, even a thin-walled molded article having a reduced weight, such as, for example, an automotive component, can be produced as a high-quality molded article having no noticeable flow marks. Furthermore, the propylene-based block copolymer of the invention is usable as a raw material for high-quality appearance improvers.

MODES FOR CARRYING OUT THE INVENTION

The propylene-based block copolymer of the invention is a propylene-based block copolymer which includes 80 to 60% by weight of crystalline propylene polymer portion and 20 to 40% by weight of propylene/ethylene random copolymer portion and which satisfies the following requirements (a) to (e):
(a) the crystalline propylene polymer portion has an intrinsic viscosity $[\eta]p$ of 0.90 dL/g or less,
(b) the propylene/ethylene random copolymer portion has an intrinsic viscosity $[\eta]c$ of 7.0 dL/g or higher,
(c) the propylene/ethylene random copolymer portion has an ethylene content of 35 to 50% by weight,
(d) the ratio ($[\eta]c/[\eta]p$) of the intrinsic viscosity $[\eta]c$ of the propylene/ethylene random copolymer portion to the intrinsic viscosity $[\eta]p$ of the crystalline propylene polymer portion is 7.5 to 30, and
(e) the propylene-based block copolymer has a MFR of 10 to 50 g/10 min.

One feature of this propylene-based block copolymer resides in that the proportion of the propylene/ethylene random copolymer portion is as high as 20 to 40% by weight and that the intrinsic viscosity $[\eta]c$ of the propylene/ethylene random copolymer is as high as 7.0 dL/g or above. The propylene-based block copolymer of the invention is characterized by having the effect of improving flow marks when used as an additive ingredient even in a small addition amount.

The intrinsic viscosity $[\eta]p$ of the crystalline propylene polymer portion as a component of the propylene-based block copolymer is 0.90 dL/g or less, preferably 0.89 dL/g or less, more preferably 0.88 dL/g or less. Since the intrinsic viscosity thereof is 0.90 dL/g or less, a decrease in flowability can be avoided and the effect of improving flow marks by a reduction in shear stress can be obtained. There is no particular lower limit on the intrinsic viscosity $[\eta]p$ of the crystalline propylene polymer portion, and a lower limit thereof should be determined in accordance with influences on the viscosity and properties of the polypropylene-based resin composition into which the block copolymer has been incorporated as an additive ingredient. Preferably, however, the intrinsic viscosity thereof is 0.75 dL/g or higher.

Here, the values of intrinsic viscosity are ones obtained through a measurement made with an Ubbelohde viscometer at a temperature of 135° C. using decaline as a solvent.

The crystalline propylene polymer portion usually is a propylene homopolymer obtained by causing propylene to homopolymerize. However, this crystalline propylene polymer portion may be a propylene copolymer obtained by copolymerizing a small amount of one or more comonomers so long as the effects of the invention are not lessened thereby. Examples of the comonomers include α-olefins such as ethylene and 1-butene. The content of such comonomers is preferably less than 3% by weight, more preferably less than 1% by weight, based on the propylene copolymer.

The crystalline propylene polymer portion may be produced by either single-stage polymerization or multistage polymerization, and is usually produced by single-stage polymerization. In the case where the crystalline propylene polymer portion is produced by multistage polymerization, the [η]p is the intrinsic viscosity of the crystalline propylene polymer portion obtained at the time when the final polymerization has been completed. In the case of producing the crystalline propylene polymer portion by multistage polymerization, the (co)polymers each having a comonomer content less than about 10% by weight, among the (co)polymers produced in the individual polymerization stages, should be taken as constituent components of the crystalline propylene polymer portion.

The intrinsic viscosity [η]c of the propylene/ethylene random copolymer portion as a component of the propylene-based block copolymer is 7.0 dL/g or higher, preferably 8.0 dL/g or higher, more preferably 9.0 dL/g or higher. Since the intrinsic viscosity thereof is 7.0 dL/g or higher, the effect of improving flow marks by an increase in normal stress is obtained. There is no particular upper limit on the intrinsic viscosity [η]c of the propylene/ethylene random copolymer portion, and an upper limit thereof should be determined in accordance with influences on the viscosity and properties of the polypropylene-based resin composition into which the block copolymer has been incorporated as an additive ingredient. Preferably, however, the intrinsic viscosity thereof is 15 dL/g or less.

Here, the intrinsic viscosity [η]c is a value calculated using the following equation.

$$[\eta]c=(100\times[\eta]F-(100-Wc)\times[\eta]p)/Wc$$

([η]F represents the intrinsic viscosity of the propylene-based block copolymer (determined through a measurement made with an Ubbelohde viscometer at a temperature of 135° C. using decaline as a solvent), [η]p represents the intrinsic viscosity of the crystalline propylene polymer portion, and Wc represents the proportion (% by weight) of the propylene/ethylene random copolymer portion.)

The propylene/ethylene random copolymer portion usually is a propylene/ethylene random copolymer obtained by copolymerizing propylene with ethylene. However, this copolymer may be a copolymer of multiple monomers, e.g., a terpolymer, obtained by copolymerizing a small amount of one or more other comonomers so long as this copolymerization does not defeat the object of the invention. Examples of such other monomers include α-olefins such as 1-butene.

The propylene/ethylene random copolymer portion may be produced by either single-stage polymerization or multistage polymerization, and is usually produced by single-stage polymerization. In the case of producing the propylene/ethylene random copolymer portion by multistage polymerization, the copolymers each having an ethylene comonomer content of about 10% by weight or higher, among the copolymers produced in the individual polymerization stages, should be taken as constituent components of the propylene/ethylene random copolymer portion.

The ethylene content of the propylene/ethylene random copolymer portion is 35 to 50% by weight, preferably 38 to 48% by weight, more preferably 40 to 45% by weight. Since the ethylene content thereof is 50% by weight or less, the block copolymer itself gives molded articles having a favorable appearance and this block copolymer, when incorporated as an additive ingredient, evenly disperses in the material to be modified and enables the resultant polypropylene-based resin composition to give molded articles having a favorable appearance. Since the ethylene content thereof is 35% by weight or higher, the polypropylene-based resin composition into which the block copolymer has been incorporated as an additive ingredient can be prevented from decreasing in low-temperature impact resistance (brittleness temperature).

In the propylene-based block copolymer of the invention, the ratio ([η]c/[η]p) of the intrinsic viscosity [η]c of the propylene/ethylene random copolymer portion to the intrinsic viscosity [η]p of the crystalline propylene polymer portion is 7.5 to 30, preferably 8 to 30, more preferably 9 to 20. Since the ratio is 30 or less, the block copolymer itself gives molded articles having a favorable appearance and this block copolymer, when incorporated as an additive ingredient, evenly disperses in the material to be modified and enables the resultant polypropylene-based resin composition to give molded articles having a favorable appearance. Since the ratio is 7.5 or higher, the effect of improving flow marks is obtained.

The propylene-based block copolymer of the invention has a melt flow rate (MFR) of 10 to 50 g/10 min, preferably 20 to 45 g/10 min, more preferably 30 to 39 g/10 min. Since the MFR thereof is 50 g/10 min or less, the polypropylene-based resin composition into which the block copolymer has been incorporated as an additive ingredient can be prevented from having too high MFR and from thereby decreasing in property. Since the MFR of the block copolymer is 10 g/10 min or higher, the polypropylene-based resin composition into which the block copolymer has been incorporated as an additive ingredient can be prevented from conversely having too low MFR and from thereby decreasing in moldability. Here, the values of MFR are ones measured in accordance with JIS-K-7210 at a temperature of 230° C. and a load of 21.18 N.

In the propylene-based block copolymer of the invention, the proportion of the crystalline propylene polymer portion is 60 to 80% by weight, preferably 65 to 79% by weight, more preferably 65 to 75% by weight. Meanwhile, the proportion of the propylene/ethylene random copolymer portion is 20 to 40% by weight, preferably 21 to 35% by weight, more preferably 25 to 35% by weight. Here, the sum of the proportion of the crystalline propylene polymer portion and the proportion of the propylene/ethylene random copolymer portion is 100% by weight. Since the proportion of the crystalline propylene polymer portion is 80% by weight or less (since the proportion of the propylene/ethylene random copolymer portion is 20% by weight or higher), the effect of improving flow marks is sufficiently obtained. Since the proportion of the crystalline propylene polymer portion is 60% by weight or higher (since the proportion of the propylene/ethylene random copolymer portion is 40% by weight or less), the propylene-based block copolymer can be prevented from decreasing in MFR and the polypropylene-based resin composition into which the block copolymer has been incorporated as an additive ingredient can also be prevented from decreasing in MFR and from decreasing in moldability.

The propylene-based block copolymer of the invention usually is a mixture of the crystalline propylene polymer portion and the propylene/ethylene random copolymer portion. This block copolymer is obtained by production steps including polymerization for producing the crystalline propylene polymer (preceding-stage polymerization) and polymerization for subsequently producing the propylene/ethylene random copolymer portion (subsequent-state polymerization).

The crystalline propylene polymer is produced through one polymerization step or through two or more polymerization steps (the steps are conducted under the same or different reaction conditions), and the propylene/ethylene random copolymer portion also is produced through one polymerization step or through two or more polymerization steps (the steps are conducted under the same or different reaction conditions). Consequently, the overall steps for producing the propylene-based block copolymer of the invention are multistage polymerization steps including at least two sequential stages.

Although the polymerization may be conducted batchwise, semi-batchwise, or continuously, it is industrially preferred to employ continuous polymerization.

With respect to modes of polymerization, use can be made of slurry polymerization in which an inert hydrocarbon such as hexane, heptane, octane, benzene, or toluene is used as a polymerization solvent, bulk polymerization in which the propylene itself is used as a polymerization solvent, and gas-phase polymerization in which the starting-material propylene is polymerized in a gas-phase state. It is also possible to use these polymerization modes in combination.

Examples thereof include: a method in which preceding-stage polymerization is conducted by bulk polymerization and subsequent-stage polymerization is conducted by gas-phase polymerization; a method in which preceding-stage polymerization is conducted by gas-phase polymerization and subsequent-stage polymerization is conducted by gas-phase polymerization; and a method in which preceding-stage polymerization is conducted by bulk polymerization and successively by gas-phase polymerization and subsequent-stage polymerization is conducted by gas-phase polymerization.

In the invention, the crystalline propylene polymer has a relatively low viscosity and hence requires a high hydrogen concentration during polymerization, while the propylene/ethylene random copolymer requires a relatively high ethylene concentration, making it difficult to liquefy the propylene. A higher pressure is hence necessary for bulk polymerization. Consequently, slurry polymerization and gas-phase polymerization are preferred. It is more preferable that preceding-stage polymerization should be conducted in a gas-phase first reactor and subsequent-stage polymerization be conducted in a gas-phase second reactor.

The reactors for polymerization are not particularly limited in shape or structure. Examples thereof include the reactors equipped with a stirrer and tubular reactors which are in general use in slurry polymerization and bulk polymerization and the fluidized-bed reactors and horizontal reactors having stirring blades which are in general use in gas-phase polymerization. Polymerization in a fluidized-bed reactor or in a horizontal reactor having stirring blades is preferred since activity control is easy when the crystalline propylene polymer is produced. In particular, polymerization in a fluidized-bed reactor is more preferred since operation conditions in a wide range can be employed.

In a preferred embodiment in the invention, the first reactor and second reactor are fluidized-bed reactors, or the first reactor and second reactor are horizontal reactors having stirring blades.

The kinds of polymerization catalysts usable for producing the propylene-based block copolymer are not particularly limited, and known catalysts can be used. For example, use can be made of so-called Ziegler-Natta catalysts, which are combinations of a titanium compound with an organoaluminum, or metallocene catalysts (see, for example, JP-A-5-295022). Since the propylene/ethylene random copolymer component having a higher intrinsic viscosity (higher molecular weight) is more effective in improving appearance upon addition, Ziegler-Natta catalysts, which generally are less apt to cause a chain transfer reaction during polymerization and tend to result in a higher molecular weight, are preferred.

The Ziegler-Natta catalysts include: ones in which the titanium compound is one obtained by activating, by treatment with an electron-donating compound, either the titanium trichloride or titanium trichloride composition obtained through reduction with an organoaluminum (see, for example, JP-A-47-34478, JP-A-58-23806, and JP-A-63-146906); and so-called supported catalysts obtained by fixing titanium tetrachloride to a support such as magnesium chloride (see, for example, JP-A-58-157808, JP-A-58-83006, JP-A-58-5310, and JP-A-61-218606).

As a promoter is used an organoaluminum compound. Examples thereof include trialkylaluminums such as trimethylaluminum, triethylaluminum, and triisobutylaluminum, alkylaluminum halides such as diethylaluminum chloride and diisobutylaluminum chloride, alkylaluminum hydrides such as diethylaluminum hydride, alkylaluminum alkoxides such as diethylaluminum ethoxide, aluminoxanes such as methylaluminoxane and tetrabutylaluminoxane, and composite organoaluminum compounds such as dibutyl methylboronate and lithium aluminum tetraethyl. It is also possible to use a mixture of two or more thereof.

Since such an organoaluminum compound used as a promoter functions also as a chain transfer agent during polymerization, it is preferred to use the organoaluminum compound in a concentration lowered as much as possible to such a degree that the compound is not inhibited form exhibiting the activity of the promoter. Specifically, it is preferred to regulate the use amount of the organoaluminum so that during the polymerization (subsequent-stage) for producing the propylene/ethylene random copolymer portion, the powder retained in the reactor has an aluminum atom concentration of 30 to 80 ppm.

Various polymerization additives for improving stereoregularity, controlling particle properties, controlling solvent-soluble content, controlling molecular weight distribution, etc. can be used for the catalysts. Examples thereof include electron-donating compounds including organosilicon compounds such as diphenyldimethoxysilane and tert-butylmethyldimethoxysilane, esters such as ethyl acetate, butyl benzoate, methyl p-toluate, and dibutyl phthalate, ketones such as acetone and methyl isobutyl ketone, ethers such as diethyl ether, organic acids such as benzoic acid and propionic acid, and alcohols such as ethanol and butanol.

In the polymerization (preceding-stage polymerization) for producing the crystalline propylene polymer portion, propylene is fed to the reactor together with one or more comonomers as an optional ingredient and a chain transfer agent, e.g., hydrogen, and the propylene is polymerized in the presence of a polymerization catalyst under the conditions of, for example, a temperature of 50 to 150° C., preferably 50 to 70° C., a partial propylene pressure of 0.5 to 4.5 MPa, preferably 1.0 to 3.0 MPa, and an average residence time for the powder retained in the reactor of 0.5 to 5.0 hr. Thus, a crystalline propylene polymer portion can be produced.

In this operation, since it is necessary to produce a crystalline propylene polymer portion having an intrinsic viscosity [η]p of 0.90 dL/g or less, it is necessary to regulate the concentration of the chain transfer agent, e.g., hydrogen, to a relatively high value to control the [η]p, although the concentration thereof depends on the process and the kind of the catalyst.

Subsequently, the polymerization (subsequent-state polymerization) for producing the propylene/ethylene random copolymer portion is conducted. Propylene, ethylene, one or more comonomers as an optional ingredient, and a chain transfer agent, e.g., hydrogen, are fed to the reactor and propylene/ethylene random copolymerization is conducted in the presence of the polymerization catalyst (the catalyst used in the preceding-stage polymerization) under the conditions of, for example, a temperature of 50 to 150° C., preferably 50 to 90° C., a partial propylene pressure and a partial ethylene pressure of 0.3 to 4.5 MPa each, preferably 0.5 to 3.5 MPa each, and an average residence time for the powder retained in the reactor of 1.0 to 7.0 hr, thereby producing a propylene/ethylene random copolymer portion. Thus, a propylene-based block copolymer can be obtained as a final product.

In this operation, since the propylene/ethylene random copolymer portion in the propylene-based block copolymer of the invention should have an intrinsic viscosity $[\eta]c$ of 7.0 dL/g or higher, it is preferred to regulate the concentration of the chain transfer agent, e.g., hydrogen, to a relatively low value although the concentration thereof depends on the process and the kind of the catalyst.

When the propylene/ethylene random copolymer is produced, a chain transfer agent is caused to be present or no chain transfer agent is used. It is, however, preferred that a chain transfer agent should be caused to be present in a small amount for the purpose of delicately regulating the intrinsic viscosity $[\eta]c$ of the propylene/ethylene random copolymer to be obtained. In case where a chain transfer agent is present in too large amount, the $[\eta]c$ is too low and the effect of improving flow marks is not obtained.

In the case of using hydrogen as a chain transfer agent, the molar ratio of hydrogen to propylene in the second reactor is preferably 0.00001 to 0.05, more preferably 0.0001 to 0.001.

One feature of the propylene-based block copolymer of the invention resides in that the proportion of the propylene/ethylene random copolymer portion therein is high. It is therefore preferable, from the standpoint of enabling the catalyst to retain high activity in the subsequent-stage polymerization, that conditions suitable for controlling the catalytic activity, such as a low polymerization temperature, low partial propylene pressure, and short polymerization period, should be used in the preceding-stage polymerization. Meanwhile, in the subsequent-stage polymerization, conditions suitable for rendering the catalytic activity high (high polymerization temperature, high partial propylene and ethylene pressures, and long polymerization period) are preferred.

Specifically, it is preferable that the polymerization period (average residence time) in the preceding-stage polymerization should be shorter than the polymerization period (average residence time) in the subsequent-stage polymerization. Namely, it is preferable that the average residence time for the powder retained in the first reactor where the preceding-stage polymerization is conducted should be shorter than the average residence time for the powder retained in the second reactor where the subsequent-stage polymerization is conducted.

Here, the term "average residence time" means polymerization period in the case of batch polymerization. In the case of continuous polymerization, that term means a value calculated from the weight (kg) of the powder retained in the reactor and the weight (kg/hr) of the polymer powder which is discharged from the reactor per unit time period, using the calculation formula [weight of the powder retained in reactor (kg)]/[weight of the polymer powder discharged from reactor per unit time period (kg/hr)].

In the case where the preceding-stage polymerization is conducted in multiple stages, the sum of the average residence times in the respective stages is taken as the average residence time for the powder retained in the first reactor. Similarly, in the case where the subsequent-stage polymerization is conducted in multiple stages, the sum of the average residence times in the respective stages is taken as the average residence time for the powder retained in the second reactor.

It is also preferable that the polymerization temperature in the preceding-stage polymerization should be lower than the polymerization temperature in the subsequent-stage polymerization. Namely, it is preferable that the polymerization temperature in the first reactor should be lower than the polymerization temperature in the second reactor. It is preferable that the polymerization temperature in the first reactor should be lower than the polymerization temperature in the second reactor by 2° C. or more.

In the case where the preceding-stage polymerization is conducted in multiple stages, an arithmetic average of the polymerization temperatures in the respective stages is taken as the polymerization temperature in the first reactor. Similarly, in the case where the subsequent-stage polymerization is conducted in multiple stages, an arithmetic average of the polymerization temperatures in the respective stages is taken as the polymerization temperature in the second reactor.

Furthermore, it is preferred to introduce an alcohol after the polymerization in the preceding-stage polymerization step and in the course of polymerization in the subsequent-stage polymerization step, for the purpose of preventing gel formation, which is thought to be attributable to the poor dispersion of the propylene/ethylene random copolymer. The amount of the alcohol to be introduced is preferably 1.0 to 2.0 in terms of the molar ratio thereof to the organoaluminum introduced in the preceding-stage polymerization (alcohol/organoaluminum).

Namely, it is preferable that the molar ratio of the alcohol to be supplied to the second reactor to the organoaluminum to be supplied to the first reactor (alcohol/organoaluminum) should be 1.0 to 2.0.

Examples of the alcohol include methyl alcohol, ethyl alcohol, n-propyl alcohol, and isopropyl alcohol.

By incorporating the propylene-based block copolymer of the invention as an additive ingredient which is an appearance improver into a polypropylene-based resin material to be modified, the molded articles are made to have an improved appearance mainly regarding flow marks. The term "polypropylene-based resin material to be modified" herein means a polypropylene-based resin material which develops flow-mark molding defects when the propylene-based block copolymer is not incorporated thereinto but which is reduced in flow-mark molding defects by incorporating the propylene-based block copolymer thereinto.

The propylene-based block copolymer of the invention can be incorporated in an amount of preferably 2 to 30 parts by weight, more preferably 2 to 25 parts by weight, even more preferably 3 to 18 parts by weight, based on the polypropylene-based resin material to be modified. So long as the amount thereof is 2 parts by weight or larger, the flow-mark appearance of molded articles can be sufficiently improved. So long as the amount thereof is 30 parts by weight or less, the propylene-based block copolymer exerts only slight influences on those properties of the polypropylene-based resin material to be modified which are desired to remain unchanged, while attaining an improvement in appearance. Such amounts thereof are hence preferred.

The propylene-based block copolymer of the invention may be pelletized, for example, by underwater cutting pelletization to give polypropylene pellets. The polypropylene pellets can be produced by kneading the propylene-based block copolymer at a resin temperature of 180 to 250° C. and then pelletizing the copolymer with an underwater cutting pelletization. Preferred as a kneading machine for use in the kneading is a kneading extruder, in particular, a single-screw kneading extruder or a twin-screw kneading extruder.

An antioxidant, neutralizer, antistatic agent, weathering stabilizer, etc. may have been incorporated into the polypropylene pellets. Furthermore, the propylene pellets may contain a propylene/ethylene block copolymer, an inorganic filler, an elastomer, etc. These ingredients can become some of the polypropylene-based resin material to be modified.

As the polypropylene-based resin material to be modified, use can be made, for example, of propylene homopolymers, propylene/ethylene random copolymers, propylene/ethylene block copolymers, and the like. However, propylene/ethylene block copolymers or polypropylene-based resin materials containing these copolymers as main components are preferred. Examples thereof include polypropylene-based resin materials containing an inorganic filler, elastomer, etc.

Specifically, the polypropylene-based resin material to be modified may be a polypropylene-based resin material including (A) a propylene/ethylene block copolymer, (B) an inorganic filler, and (C) an elastomer. For example, the content of the propylene/ethylene block copolymer (A) is 40 to 98% by weight, preferably 45 to 96% by weight, more preferably 50 to 90% by weight, that of the inorganic filler (B) is 1 to 35% by weight, preferably 2 to 30% by weight, more preferably 5 to 25% by weight, and that of the elastomer (C) is 1 to 30% by weight, preferably 2 to 25% by weight, more preferably 5 to 20% by weight.

Examples of the propylene/ethylene block copolymer (A) include a block copolymer including a crystalline polypropylene polymer part and a propylene/ethylene random copolymer part. The crystalline polypropylene polymer part is either a propylene homopolymer or a propylene copolymer obtained by copolymerizing propylene with a small amount of other α-olefin(s). The term "crystalline" means that the isotactic index (proportion of components insoluble in boiling n-heptane) is usually 90% by weight or higher, preferably 95 to 100% by weight.

The crystalline polypropylene polymer part is not particularly limited. However, the block copolymer is prepared so that the crystalline polypropylene polymer part accounts for usually 50 to 92% by weight, preferably 60 to 91% by weight, more preferably 70 to 90% by weight, of the whole propylene/ethylene block copolymer, and that the propylene/ethylene random copolymer part accounts for usually 8 to 50% by weight, preferably 9 to 40% by weight, more preferably 10 to 30% by weight, of the whole propylene-ethylene block copolymer.

The MFR of the propylene/ethylene block copolymer is not particularly limited. However, the MFR thereof is preferably 10 to 200 g/10 min, more preferably 15 to 150 g/10 min.

The intrinsic viscosity of the propylene/ethylene random copolymer part is usually about 1.5 to 5 dL/g, preferably about 2 to 4.5 dL/g.

One such propylene/ethylene block copolymer may be used alone, or two or more such propylene/ethylene block copolymers may be used as a mixture thereof.

For producing the propylene/ethylene block copolymer, it is preferred to use a highly stereoregular catalyst as the catalyst. As a method for polymerization, any of conventionally known methods can be employed. However, the same techniques as the above-described processes for producing the propylene-based block copolymer may be used.

In the case of producing the propylene/ethylene block copolymer in which the proportion of the propylene/ethylene random copolymer part is high, a gas-phase fluidized-bed method is especially preferred. By newly adding an electron-donating compound in the subsequent-stage reaction, troubles such as sticking and clogging can be avoided and polymerization operability can be improved.

Incidentally, various commercial products of those resins usable as the polypropylene-based resin material to be modified, such as propylene homopolymers, propylene/ethylene random copolymers, and propylene/ethylene block copolymers, are supplied by many companies (e.g., Novatec series, manufactured by Japan Polypropylene Corp.), and desired resins can be procured and used.

The inorganic filler (B) is not particularly limited in kind, composition, shape, etc.

Examples of the inorganic filler include platy inorganic fillers such as talc, mica, and montmorillonite, fibrous inorganic fillers such as short glass fibers, long glass fibers, carbon fibers, aramid fibers, alumina fibers, boron fibers, and Zonolite, acicular (whisker) inorganic fillers such as potassium titanate, magnesium oxysulfate, silicon nitride, aluminum borate, basic magnesium sulfate, zinc oxide, wollastonite, and calcium carbonate, particulate inorganic fillers such as precipitated calcium carbonate, heavy calcium carbonate, and magnesium carbonate, and inorganic balloon fillers such as glass balloons. Such inorganic fillers may be used alone or in combination of two or more thereof. Of these, talc is preferred from the standpoint of balance between properties and cost.

Use may be made of an inorganic filler, e.g., talc, which has undergone a surface treatment with, for example, any of various organic titanate-based coupling agents and organic silane coupling agents, a modified polyolefin onto which an unsaturated carboxylic acid or its anhydride has been grafted, a fatty acid, a metal salt of a fatty acid, a fatty acid ester, or the like, for the purpose of improving adhesiveness to polymers or dispersibility in polymers.

Examples of the elastomer (C) include ethylene/α-olefin copolymer elastomers such as ethylene/propylene copolymer elastomers (EPR), ethylene/butene copolymer elastomers (EBR), ethylene/hexene copolymer elastomers (EHR), and ethylene/octene copolymer elastomers (EOR), ethylene/α-olefin/diene terpolymer elastomers (EPDM) such as ethylene/propylene/ethylidene norbornene copolymer elastomers, ethylene/propylene/butadiene copolymer elastomers, and ethylene/propylene/isoprene copolymer elastomers, and styrene-based elastomers such as styrene/butadiene/styrene triblock copolymers (SBS), styrene/isoprene/styrene triblock copolymers (SIS), hydrogenated styrene/butadiene/styrene triblock copolymers (SEBS), and hydrogenated styrene/isoprene/styrene triblock copolymers (SEPS). Incidentally, the hydrogenated styrene/butadiene/styrene triblock copolymers mentioned above have a polymer backbone which, when viewed in terms of monomer units, is expressed by styrene-ethylene/butene-styrene, and are hence usually referred to as SEBS for brevity.

These elastomers can be used alone or as a mixture of two or more thereof.

The polypropylene-based resin material to be modified according to the invention can be produced by kneading those constituent ingredients using an ordinary kneading machine such as, for example, a kneading extruder, Banbury mixer, rolls, Brabender Plastograph, or kneader at a set temperature of, for example, 180 to 250° C. It is preferred to produce the resin material using a kneading extruder, in particular, a twin-screw kneading extruder, among those kneading machines.

The polypropylene-based resin composition of the invention can be obtained by dry-blending or melt-kneading the polypropylene-based resin material to be modified and the propylene-based block copolymer of the invention. Use may also be made of a method in which the polypropylene-based resin material to be modified and the propylene-based block copolymer of the invention are supplied respectively to separate raw-material supply ports (hoppers, etc.) of a molding machine to obtain the polypropylene-based resin composition during the step of molding. In the case where the propylene-based block copolymer of the invention is incorporated as an additive ingredient (as an appearance improver), dry blending is preferred since changes in addition amount for obtaining a desired appearance are easy. Even when the propylene-based block copolymer is replaced with the polypropylene pellets, the polypropylene-based resin composition of the invention can be obtained.

The polypropylene-based resin composition of the invention is processed into a desired molded article. Methods for the molding are not particularly limited, and the resin composition can be molded by any of various molding methods in accordance with purposes. For example, injection molding, extrusion molding, or the like can be used. However, the effect of improving moldability and improving flow marks, weld lines, or the like is apt to be remarkably obtained when large molded articles are produced by injection molding.

The polypropylene-based resin composition of the invention is suitable for automotive exterior components including bumpers, rocker moldings, side moldings, and over fenders.

EXAMPLES

The present invention will be explained below in more detail on the basis of Examples, but the invention should not be construed as being limited to the following Examples.

The analysis conducted in the Examples and Comparative Examples and the evaluation methods used therein are as follows.
1. Melt Flow Rate (MFR) (Unit: g/10 Min)

A measurement was made in accordance with JIS-K-7210 under the conditions of a temperature of 230° C. and a load of 21.18 N.
2. Methods for Analysis of Propylene-based Block Copolymer for Properties For examining each propylene-based block copolymer for the proportion (Wc) of the propylene/ethylene random copolymer portion (hereinafter sometimes referred to as "rubber component"), ethylene content, and intrinsic viscosity, measurements are made using the following apparatus and conditions in the following manners.
(1) Analytical Apparatus to be Used
(i) Cross Fraction Chromatograph CFC T-100 (abbreviated to CFC), manufactured by DIA Instruments Co., Ltd.
(ii) Fourier Transformation Infrared Absorption Spectrometry FT-IR; 1760X, manufactured by PerkinElmer, Inc.

The fixed-wavelength type infrared spectrophotometer which has been attached as a detector of the CFC is detached, and the FT-IR is connected instead. This FT-IR is used as a detector. The transfer line extending from the outlet for solutions discharged from the CFC to the FT-IR is made to have a length of 1 m, and the temperature thereof is kept at 140° C. throughout the measurement. A flow cell having an optical path length of 1 mm and an optical path width of 5 mm (diameter) is attached to the FT-IR, and the temperature thereof is kept at 140° C. throughout the measurement.
(iii) Gel Permeation Chromatography (GPC)

As the GPC columns in the latter-stage portion of the CFC, three AD806MS columns, manufactured by Showa Denko K.K., which have been serially connected are used.
(2) CFC Measurement Conditions
(i) Solvent: o-dichlorobenzene (ODCB)
(ii) Sample concentration: 4 mg/mL
(iii) Injection amount: 0.4 mL
(iv) Crystallization: Temperature is lowered from 140° C. to 40° C. over about 40 minutes.
(v) Fractionation Method:

In temperature-rising elution fractionation, use is made of fractionation temperatures of 40, 100, and 140° C. to separate the sample into three fractions in total. The proportions (unit: % by weight) of the components eluted at 40° C. and lower (fraction 1), the components eluted at 40 to 100° C. (fraction 2), and the components eluted at 100 to 140° C. (fraction 3) are defined as $W_{40}$, $W_{100}$, and $W_{140}$, respectively. $W_{40}+W_{100}+W_{140}=100$ holds. The fractions separated are automatically transported as such to an FT-IR analyzer.
(vi) Solvent flow rate during elution: 1 mL/min
(3) FT-IR Measurement Conditions After the sample solution begins to be eluted from the GPC columns in the latter-stage portion of the CFC, an FT-IR measurement is conducted under the following conditions to acquire GPC-IR data on each of the fractions 1 to 3.
(i) Detector: MCT
(ii) Resolution: 8 $cm^{-1}$
(iii) Measurement interval: 0.2 min (12 sec)
(iv) Number of integrations per measurement: 15
(4) Post-Processing and Analysis of Measurement Results The amount of the components eluted at each temperature and the molecular weight distribution thereof are determined using as a chromatogram the absorbances at 2,945 $cm^{-1}$ obtained by the FT-IR analysis. The amount of the eluted components of each fraction is normalized so that the sum of the amounts of the eluted components of the fractions is 100%. For converting retention volume to molecular weight, use is made of a calibration curve produced beforehand with standard polystyrenes.

The standard polystyrenes to be used are the following grades, which are all manufactured by Tosoh Corp.
F380, F288, F128, F80, F40, F20, F10, F4, F1, A5000, A2500, and A1000.

Solutions respectively prepared by dissolving the standard polystyrenes in ODCB (containing 0.5 mg/mL BHT) so as to result in a concentration of 0.5 mg/mL are each injected in an amount of 0.4 mL to produce a calibration curve. For the calibration curve, use is made of a cubic equation obtained through approximation by the least square method. For the conversion into molecular weight, a general-purpose calibration curve is used with reference to Sadao MORI, Saizu Haijo Kuromato-gurafi (Kyoritsu Shuppan). The following numerals are used in the viscosity formula ($[\eta]=K \times M\alpha$) to be used therefor.

(i) For producing Calibration Curve using Standard Polystyrenes
K=0.000138, α=0.70
(ii) For examining Propylene-based Block Copolymer Sample
K=0.000103, α=0.78

The ethylene content distribution of the eluted components (distribution of ethylene content along the axis of molecular weight) is determined by converting each ratio between the absorbance at 2,956 cm$^{-1}$ and absorbance at 2,927 cm$^{-1}$ which are obtained by FT-IR analysis into an ethylene content (% by weight) using a calibration curve produced beforehand using polyethylene, polypropylene, ethylene/propylene rubbers (EPR) having ethylene contents which were rendered known by $^{13}$C-NMR spectroscopy, etc., and mixtures thereof.

(5) Proportion of Propylene/Ethylene Random Copolymer Portion (Wc)

The proportion (Wc) of the propylene/ethylene random copolymer portion in a propylene-based block copolymer in the invention is in theory defined by the following equation (I) and is determined in the following manner.

$$Wc(\% \text{ by weight}) = W_{40} \times A_{40}/B_{40} + W_{100} \times A_{100}/B_{100} \quad (I)$$

In equation (I), $W_{40}$ and $W_{100}$ are the proportions (unit: % by weight) of the respective eluted fractions described above; $A_{40}$ and $A_{100}$ are the actually determined average ethylene contents (unit: % by weight) of the fractions respectively corresponding to $W_{40}$ and $W_{100}$; and $B_{40}$ and $B_{100}$ are the ethylene contents (unit: % by weight) of the propylene/ethylene random copolymer portions contained in the respective fractions. Methods for determining $A_{40}$, $A_{100}$, $B_{40}$, and $B_{100}$ will be described later.

Equation (I) has the following meaning. The first term in the right side of equation (I) is a term for calculating the amount of the propylene/ethylene random copolymer portion contained in fraction 1 (portion soluble at 40° C.). In the case where fraction 1 contains a propylene/ethylene random copolymer only and does not contain any crystalline propylene polymer portion, $W_{40}$ as such contributes to the content, in the whole, of the propylene/ethylene random copolymer portion assigned to fraction 1. However, since fraction 1 contains a small amount of components (components having an extremely low molecular weight and atactic polypropylene) assigned to the crystalline polypropylene polymer portion, besides the components assigned to the propylene/ethylene random copolymer, it is necessary to make a correction to the former components.

Hence, by multiplying $W_{40}$ by $A_{40}/B_{40}$, the amount of the components in fraction 1 which are assigned to the propylene/ethylene random copolymer is calculated. For example, in cases when the average ethylene content ($A_{40}$) of fraction 1 is 30% by weight and the ethylene content ($B_{40}$) of the propylene/ethylene random copolymer contained in fraction 1 is 40% by weight, then $^{30}/_{40} = ^{3}/_{4}$ (i.e., 75% by weight) of fraction 1 is assigned to the propylene/ethylene random copolymer and ¼ thereof is assigned to the crystalline propylene polymer portion.

This operation of multiplying by $A_{40}/B_{40}$ in the first term in the right side means to calculate the contribution of the propylene/ethylene random copolymer from the proportion in % by weight of fraction 1 ($W_{40}$). The same applies to the second term in the right side. The contribution of the propylene/ethylene random copolymer is calculated for each fraction, and the results are summed up, thereby giving the content of the propylene/ethylene random copolymer portion.

(i) As described above, the average ethylene contents of fractions 1 and 2 obtained by the CFC examination are respectively referred to as $A_{40}$ and $A_{100}$ (the unit is % by weight each).

A method for determining the average ethylene contents will be described later.

(ii) The ethylene content which corresponds to the peak position in a differential molecular weight distribution curve of fraction 1 is referred to as $B_{40}$ (the unit is % by weight). With respect to fraction 2, since the rubber portion is thought to be wholly eluted at 40° C. and the same definition cannot hence be used, $B_{100}$ is defined substantially as $B_{100}=100$ in the invention. Although $B_{40}$ and $B_{100}$ are the ethylene contents of the propylene/ethylene random copolymer portions contained in the respective fractions, it is substantially impossible to analytically determine values of these. The reason therefor is that there is no means for completely separating/isolating the propylene homopolymer and the propylene/ethylene random copolymer which are present as a mixture thereof in each fraction.

As a result of investigations made with various model samples, it has been found that in cases when the ethylene content corresponding to the peak position of the differential molecular weight distribution curve of fraction 1 is used as $B_{40}$, the effect of improving material properties can be explained satisfactorily. Furthermore, because $B_{100}$ has crystallinity assigned to ethylene chains and because the amount of the propylene/ethylene random copolymer contained in these fractions is relatively small as compared with the amount of the propylene/ethylene random copolymer contained in fraction 1, the approximation of $B_{100}$ at 100 is close to the actual state and calculations therewith result in little error. Consequently, $B_{100}=100$ is used to analyze the results.

(iii) For the reasons shown above, the proportion (Wc) of the propylene/ethylene random copolymer portion is determined in accordance with the following equation.

$$Wc(\% \text{ by weight}) = W_{40} \times A_{40}/B_{40} + W_{100} \times A_{100}/100 \quad (II)$$

Namely, the $W_{40} \times A_{40}/B_{40}$ which is the first term in the right side of equation (II) indicates the content (% by weight) of a propylene/ethylene random copolymer having no crystallinity, and the $W_{100} \times A_{100}/100$ which is the second term indicates the content (% by weight) of a propylene/ethylene random copolymer portion having crystallinity.

Here, $B_{40}$ and the average ethylene contents $A_{40}$ and $A_{100}$ of fractions 1 and 2 obtained by the CFC examination are determined in the following manner.

The ethylene content corresponding to the peak position in a differential molecular weight distribution curve is $B_{40}$. Furthermore, the total of products which each is the product of a proportion by weight for a data point and an ethylene content for the data point, the products for the data points being incorporated during the measurement, is the average ethylene content $A_{40}$ of fraction 1. The average ethylene content $A_{100}$ of fraction 2 is determined in the same manner.

Incidentally, the setting of the three fractionation temperatures has the following meanings. In the CFC analysis in the invention, the temperature of 40° C. means temperature conditions which are necessary and sufficient for separating polymers having no crystallinity (e.g., most of the propylene/ethylene random copolymer, or components of the crystalline propylene polymer portion which have an exceedingly low molecular weight or atactic components thereof). 100° C. is a temperature which is necessary and sufficient for dissolving only the components that are insoluble at 40° C. but soluble at 100° C. (e.g., components of the propylene/ethylene random copolymer which have crystallinity due to ethylene and/or propylene chains, and the crystalline propylene polymer portion).

140° C. is a temperature which is necessary and sufficient for eluting only the components that are insoluble at 100° C. but soluble at 140° C. (e.g., components of the crystalline polypropylene polymer portion which have especially high crystallinity and components of the propylene/ethylene random copolymer which have an exceedingly high molecular weight and exceedingly high ethylenic crystallinity) and for wholly recovering the propylene-based block copolymer used in the analysis.

Incidentally, $W_{140}$ contains no components of the propylene/ethylene random copolymer, or if a component thereof is present, the amount thereof is extremely slight and is substantially negligible. Because of this, $W_{140}$ is excluded from the calculation of the proportion of the propylene/ethylene random copolymer and of the ethylene content of the propylene/ethylene random copolymer.

(6) Ethylene Content of the Propylene/ethylene Random Copolymer Portion

The ethylene content of the propylene/ethylene random copolymer portion of the propylene-based block copolymer in the invention is determined from the values explained above using the following equation.

Ethylene content of propylene/ethylene random copolymer portion (% by weight)=$(W_{40} \times A_{40} + W_{100} \times A_{100})/Wc$ In the equation, Wc is the proportion (% by weight) of the propylene/ethylene random copolymer portion determined above.

(7) Measurement of Intrinsic Viscosity

The intrinsic viscosities [η]p of the crystalline propylene polymer portion and propylene/ethylene random copolymer portion in the propylene-based block copolymer in the invention are measured at a temperature of 135° C. with an Ubbelohde viscometer using decaline as a solvent.

First, after completion of the polymerization for producing a crystalline propylene polymer portion, some of the product is taken out as a sample from the polymerizer and examined for intrinsic viscosity [η]p. Subsequently, after the crystalline propylene polymer portion has been produced by polymerization, a propylene/ethylene random copolymer is produced by polymerization and the resultant final polymer (F) is examined for intrinsic viscosity [η]F. [η]c is determined from the following relationship.

[η]F=(100−Wc)/100×[η]p+Wc/100×[η]c

3. Appearance of Molded Article (Evaluation of Distance to Flow Mark)

Each polypropylene-based resin composition obtained is examined for distance to a flow mark. Using an injection molding machine having a clamping force of 170 tons and a mold having a film gate with a width of 2 mm in a shorter side thereof, a flat plate having dimensions of 350 mm×100 mm×2 mm (thickness) was produced by injection molding at a molding temperature of 220° C. The flat plate was visually examined for a flow mark, and the distance from the gate to the region where a flow mark began to occur was measured. The longer the distance to the region where a flow mark begins to occur, the less the resin composition is apt to develop flow marks and the better the appearance of the molded article. The results were assessed on the basis of the following criteria.

Excellent: 185 mm or longer
Good: 170 mm or longer but less than 185 mm
Poor: less than 170 mm 4. Evaluation of Brittleness Temperature A measurement was made in accordance with ASTM D746, and the results were assessed on the basis of the following criteria.

Good: lower than −18.0° C.
Poor: −18.0° C. or higher

5. Overall Evaluation

On the basis of the evaluation of molded-article appearance (evaluation of distance to flow mark) and brittleness temperature, overall evaluation was made in accordance with the following criteria.

Excellent: the appearance is excellent and the property is good.
Good: the appearance is good and the property is good.
Acceptable: the appearance is excellent and the property is poor.
Poor: the appearance is good and the property is poor.
Very poor: the appearance is poor and the property is poor.

Propylene-Based Block Copolymer Production

Example 1

1. Production of Catalyst

The atmosphere in an autoclave having a capacity of 10 L and equipped with a stirrer was sufficiently replaced with nitrogen, and 2 L of purified toluene was introduced thereinto. Thereto were added, at room temperature, 200 g of diethoxymagnesium Mg(OEt)$_2$ and 1 L of titanium tetrachloride. The temperature was elevated to 90° C., and 50 mL of n-butyl phthalate was introduced thereinto. Thereafter, the temperature was elevated to 110° C., and the mixture was reacted for 3 hours. The reaction product was sufficiently washed with purified toluene.

Subsequently, purified toluene was introduced to regulate the total liquid amount to 2 L. One liter of titanium tetrachloride was added thereto at room temperature, and the temperature was elevated to 110° C. to react the mixture for 2 hours. The reaction product was sufficiently washed with purified toluene.

Furthermore, purified n-heptane was used to replace the toluene with the n-heptane to obtain a slurry of a solid catalyst ingredient. Some of this slurry was taken out as a sample and dried. Analysis thereof revealed that the solid catalyst ingredient had a titanium content of 2.7% by weight and a magnesium content of 18% by weight. The solid catalyst ingredient had an average particle diameter of 33 µm.

Next, the atmosphere in an autoclave having a capacity of 20 L and equipped with a stirrer was sufficiently replaced with nitrogen, and the slurry of the solid catalyst ingredient (catalyst 1-1) was introduced thereinto in an amount of 100 g in terms of the amount of the solid catalyst ingredient (catalyst 1-1). Purified n-heptane was introduced to regulate the concentration of the solid catalyst ingredient (catalyst 1-1) to 25 g/L. Thereto was added 50 mL of silicon tetrachloride SiCl$_4$. The resultant mixture was reacted at 90° C. for 1 hour. The reaction product was sufficiently washed with purified n-heptane.

Thereafter, purified n-heptane was introduced to regulate the liquid level to 4 L. Thereto were added 30 mL of dimethyldivinylsilane, 30 mL of t-butylmethyldimethoxysilane (t-C$_4$H$_9$)(CH$_3$)Si(OCH$_3$)$_2$, and 80 g, in terms of Et$_3$Al amount, of a n-heptane dilution of triethylaluminum Et$_3$Al. The resultant mixture was reacted at 40° C. for 2 hours. The reaction product was sufficiently washed with purified n-heptane, and some of the slurry obtained was taken out as a sample and dried. Analysis thereof revealed that the solid ingredient contained 1.2% by weight of titanium and 8.8% by weight of $(t\text{-}C_4H_9)(CH_3)Si(OCH_3)_2$.

Using the solid ingredient obtained above, preliminary polymerization was conducted in the following manner. Purified n-heptane was introduced into the slurry to regulate the concentration of the solid ingredient to 20 g/L. This slurry was cooled to 10° C. Thereafter, a n-heptane dilution of triethylaluminum $Et_3Al$ was added thereto in an amount of 10 g in terms of $Et_3Al$ amount, and 280 g of propylene was supplied thereto over 4 hours.

After the supply of propylene was completed, the reaction was continued for further 30 minutes. Subsequently, the gas phase was sufficiently replaced with nitrogen, and the reaction product was sufficiently washed with purified n-heptane. The slurry obtained was discharged from the autoclave and vacuum-dried to obtain a solid catalyst ingredient (catalyst 1). This solid catalyst ingredient (catalyst 1) contained polypropylene in an amount of 2.5 g per g of the solid ingredient. Analysis thereof revealed that the portion of the solid catalyst ingredient (catalyst 1) which excluded the polypropylene contained 1.0% by weight of titanium and 8.2% by weight of $(t\text{-}C_4H_9)(CH_3)Si(OCH_3)_2$.

2. Production of Propylene/Ethylene Block Copolymer

Polymerization was conducted using an apparatus for continuous polymerization configured of two fluidized-bed reactors which each had a capacity of 2,000 L and which had been connected to each other. First, polymerization was conducted in the first reactor at a polymerization temperature of 58° C. and a partial propylene pressure of 1.8 MPa (absolute pressure) while continuously supplying hydrogen as a molecular weight regulator so as to result in a hydrogen/propylene molar ratio of 0.035 and while supplying triethylaluminum at 4.0 g/hr and supplying the catalyst 1 so as to result in a polymer polymerization rate of 16 kg/hr. The powder (crystalline propylene polymer) obtained through polymerization in the first reactor was continuously discharged at a discharge rate of 16 kg/hr so that the amount of the powder retained in the reactor was 40 kg, and was continuously transferred to the second reactor (first-stage polymerization step).

Polymerization in the second reactor was conducted at a polymerization temperature of 60° C. while continuously supplying propylene and ethylene in an ethylene/propylene molar ratio of 0.44 so as to result in a monomer pressure of 1.5 MPa and further continuously supplying hydrogen as a molecular weight regulator so as to result in a hydrogen/propylene molar ratio of 0.0008. Furthermore, ethyl alcohol was supplied in an amount 1.37 times by mole the amount of the triethylaluminum supplied to the first reactor. The powder obtained through polymerization in the second reactor was continuously discharged and introduced into a vessel so that the amount of the powder retained in the reactor was 60 kg, and moisture-containing nitrogen gas was supplied thereto to terminate the reaction. Thus, a propylene/ethylene block copolymer was obtained (second-stage polymerization step).

In Table 1 are shown the reaction conditions used in the first-stage polymerization step and second-stage polymerization step and the various properties of the crystalline propylene polymer obtained in the first-stage polymerization step and of the propylene/ethylene random copolymer obtained in the second-stage polymerization step.

To 100 parts by weight of the propylene/ethylene block copolymer powder obtained were added 0.1 part by weight of tetrakis[methylene-3-(3,5'-di-t-butyl-4'-dydroxyphenyl)propionato]methane (trade name, Irganox 1010; manufactured by Ciba-Geigy Ltd.) and 0.05 parts by weight of tris(2,4-di-t-butylphenyl) phosphite (trade name, Irgafos 168; manufactured by Ciba-Geigy Ltd.) as antioxidants and 0.15 parts by weight of calcium stearate as a neutralizing agent. The ingredients were mixed and blended with a supermixer (manufactured by Kawata MFG Co., Ltd.) for 5 minutes. The resultant blend was used to obtain polypropylene pellets by the underwater cutting pelletization method using the following apparatus and conditions. The pellets obtained were used as appearance improver 1.

Kneading extruder: single-screw extruder with an inner diameter of 110 mm

Die: TiC; with 20 holes of Φ2.5; heat channel type

Cutter blades: four TiC blades; rake angle, 50°

Rate of granulation: 200 kg/hr

Cooling water temperature: 43° C.

Propylene-Based Block Copolymer Production Examples 2 to 4

Using catalyst 1, propylene/ethylene block copolymers were obtained in accordance with the procedure for propylene/ethylene block copolymer production in Production Example 1, except that the amounts of propylene and hydrogen in the first-stage polymerization, the propylene and ethylene feed rates and hydrogen amount in the second-stage polymerization, and the average residence time and polymerization temperature in each stage were changed as shown in Table 1. The various properties of the propylene/ethylene black copolymers are shown in Table 1. The propylene/ethylene block copolymer powders obtained were pelletized in the same manner as in Production Example 1, and the pelletized copolymers were used respectively as appearance improver 2 to appearance improver 4.

Propylene-Based Block Copolymer Production Examples 5 to 8

1. Production of Catalyst

A solid catalyst ingredient (catalyst 2) was obtained in the same manner as in the catalyst production in Production Example 1, except that diisopropyldimethyoxysilane $(i\text{-Pr})_2Si(OCH_3)_2$ was used in place of the $(t\text{-}C_4H_9)(CH_3)Si(OCH_3)_2$. This solid catalyst ingredient (catalyst 2) contained polypropylene in an amount of 2.0 g per g of the solid ingredient, and the portion thereof excluding the polypropylene contained 1.0% by weight of titanium and 8.0% by weight of $(i\text{-Pr})_2Si(OCH_3)_2$.

2. Production of Propylene-Ethylene Block Copolymers

Using catalyst 2, propylene/ethylene block copolymers were obtained in accordance with the procedure for propylene/ethylene block copolymer production in Production Example 1, except that the amounts of propylene and hydrogen in the first-stage polymerization, the propylene and ethylene feed rates and hydrogen amount in the second-stage polymerization, and the average residence time and polymerization temperature in each stage were changed as shown in Table 2. The various properties of the propylene/ethylene black copolymers are shown in Table 2. The propylene/ethylene block copolymer powders obtained were pelletized in the same manner as in Production Example 1, and the pelletized copolymers were used respectively as appearance improver 5 to appearance improver 8.

Propylene-Based Block Copolymer Production
Example 9

1. Production of Catalyst

Twenty liters of dehydrated and deoxidized n-heptane was introduced into a vessel which had a capacity of 50 L and was equipped with a stirrer and which had undergone sufficient nitrogen replacement. Subsequently, 10 mol of magnesium chloride and 20 mol of tetra-n-butoxytitanium $Ti(O-n-C_4H_9)_4$ were introduced thereinto, and the mixture was reacted at 95° C. for 2 hours. After completion of the reaction, the temperature was lowered to 40° C., and 12 L of methylhydropolysiloxane (having a viscosity of 20 cSt) was then introduced and reacted for 3 hours. The solid ingredient yielded was washed with n-heptane.

Subsequently, the vessel equipped with a stirrer was used, and 5 L of n-heptane which had been purified in the same manner as shown above was introduced thereinto. The solid ingredient synthesized above was introduced thereinto in an amount of 3 mol in terms of magnesium atom amount. Next, a mixture of 2.5 L of n-heptane and 5 mol of silicon tetrachloride was introduced into the flask at 30° C. over 30 minutes and reacted at 70° C. for 3 hours. After completion of the reaction, the reaction product was washed with n-heptane.

Subsequently, 2.5 L of n-heptane was introduced into the vessel equipped with a stirrer, and 0.3 mol of phthaloyl chloride was mixed and introduced at 70° C. over 30 minutes. The resultant mixture was reacted at 90° C. for 1 hour. After completion of the reaction, the reaction product was washed with n-heptane. Next, 2 L of titanium tetrachloride was introduced, and the mixture was reacted at 110° C. for 3 hours. After completion of the reaction, the reaction product was washed with n-heptane to obtain a solid ingredient (catalyst 3-1). This solid ingredient had a titanium content of 2.0% by weight.

Subsequently, 8 L of n-heptane and 400 g of the solid ingredient (catalyst 3-1) synthesized above were introduced into the vessel which was equipped with a stirrer and had undergone nitrogen replacement, and 600 mL of silicon tetrachloride was introduced thereinto. The resultant mixture was reacted at 90° C. for 2 hours. After completion of the reaction, 0.54 mol of vinyltrimethylsilane $(CH_2\!=\!CH)Si(CH_3)_3$, 0.27 mol of $(t-C_4H_9)(CH_3)Si(OCH_3)_2$, and 1.5 mol of triethylaluminum were successively introduced thereinto, and the ingredients were kept in contact with one another at 30° C. for 2 hours. After completion of the contact, the product was sufficiently washed with n-heptane to obtain 390 g of a solid catalyst ingredient (catalyst 3) consisting mainly of magnesium chloride. This ingredient had a titanium content of 1.8% by weight.

2. Production of Propylene/Ethylene Block Copolymer

The atmosphere in a stainless-steel autoclave having a capacity of 400 L and equipped with a stirrer was sufficiently replaced with propylene gas, and 120 L of dehydrated and deoxidized n-heptane was introduced thereinto as a polymerization solvent. Next, 30 g of triethylaluminum, 114 L of hydrogen, and 14 g of catalyst 3 were added thereto at a temperature of 70° C. The autoclave was heated to an internal temperature of 75° C. Thereafter, propylene was supplied so as to result in a pressure of 0.3 MPaG, thereby initiating polymerization. Hydrogen was supplied so as to result in a hydrogen/propylene ratio of 2.0 (L/kg), thereby terminating the polymerization at 230 minutes after. The introduction of propylene was also ceased at 230 minutes after. The unreacted gases in the vessel were released to 0.03 MPaG. Thus, a crystalline propylene polymer portion was obtained (preceding-stage polymerization step).

Subsequently, the internal temperature of the autoclave was set at 65° C., and 12.5 cc of n-butanol was then introduced thereinto. Next, propylene and ethylene were supplied at 3.5 kg/hr and 1.5 kg/hr, respectively. At 1.4 hours thereafter, the supply of ethylene and propylene was ceased to terminate the polymerization. The pressure, which had been 0.03 MPaG at the initiation of the supply of ethylene and propylene, increased gradually and was 0.04 MPaG at the time of the end of the supply (subsequent-stage polymerization step).

The slurry obtained was transferred to a next vessel equipped with a stirrer, and 2.5 L of butanol was added thereto. The reaction product was treated at 70° C. for 3 hours, and the mixture was then transferred to a next vessel equipped with a stirrer. Thereto was added 100 L of pure water in which 20 g of sodium hydroxide had been dissolved. After the reaction product was treated for 1 hour, the aqueous layer was allowed to stand and then separated to remove the catalyst residue. The slurry was treated with a centrifugal separator to remove heptane, and the solid matter was treated with an 80° C. dryer for 3 hours to completely remove the heptane. Thus, a propylene/ethylene block copolymer was obtained in an amount of 55.2 kg. The various properties of the propylene/ethylene block copolymer are shown in Table 2. The propylene/ethylene block copolymer powder obtained was pelletized in the same manner as in Production Example 1, and the pellets were used as appearance improver 9.

TABLE 1

| | | | Production Example 1 | Production Example 2 | Production Example 3 | Production Example 4 |
|---|---|---|---|---|---|---|
| Mode of polymerization (first reactor/second reactor) | | | gas-phase/ gas-phase | gas-phase/ gas-phase | gas-phase/ gas-phase | gas-phase/ gas-phase |
| Catalyst | | | catalyst 1 | catalyst 1 | catalyst 1 | catalyst 1 |
| First reactor Production of crystalline propylene polymer | Polymerization temperature | ° C. | 58 | 60 | 55 | 57 |
| | Average residence time | hr | 2.5 | 2.5 | 2.5 | 2.0 |
| | Hydrogen/ propylene | molar ratio | 0.035 | 0.035 | 0.035 | 0.087 |
| Second reactor Production of propylene/ ethylene random copolymer | Polymerization temperature | ° C. | 60 | 62 | 60 | 60 |
| | Average residence time | hr | 3 | 3.1 | 2.9 | 2.3 |
| | Hydrogen/ propylene | molar ratio | 0.0008 | 0.0008 | 0.0008 | 0.0003 |

TABLE 1-continued

|  |  |  | Production Example 1 | Production Example 2 | Production Example 3 | Production Example 4 |
|---|---|---|---|---|---|---|
|  | Ethylene/propylene | molar ratio | 0.44 | 0.44 | 0.44 | 0.42 |
|  | EtOH/TEA | molar ratio | 1.37 | 1.40 | 1.52 | 1.39 |
|  | Al concentration | ppm | 47.3 | 47.3 | 47.3 | 48.2 |
| $[\eta]p$ |  | dL/g | 0.86 | 0.87 | 0.83 | 0.89 |
| $[\eta]c$ |  | dL/g | 9.2 | 9.1 | 8.6 | 9.4 |
| $[\eta]c/[\eta]p$ |  | dL/g | 11 | 10 | 10 | 11 |
| Content of propylene/ethylene copolymer |  | wt % | 22 | 22 | 21 | 24 |
| Ethylene content of propylene/ethylene copolymer |  | wt % | 45 | 43 | 44 | 42 |
| MFR |  | g/10 min | 31 | 31 | 39 | 20 |
| Propylene/ethylene block copolymer |  |  | improver 1 | improver 2 | improver 3 | improver 4 |

TABLE 2

|  |  |  | Production Example 5 | Production Example 6 | Production Example 7 | Production Example 8 | Production Example 9 |
|---|---|---|---|---|---|---|---|
| Mode of polymerization (first reactor/second reactor) |  |  | gas-phase/gas-phase | gas-phase/gas-phase | gas-phase/gas-phase | gas-phase/gas-phase | slurry/slurry |
| Catalyst |  |  | catalyst 2 | catalyst 2 | catalyst 2 | catalyst 2 | catalyst 3 |
| First reactor Production of crystalline propylene polymer | Polymerization temperature | °C. | 65 | 65 | 65 | 65 | 75 |
|  | Average residence time | hr | 2.5 | 2.3 | 2.3 | 2.3 | 3.9 |
|  | Hydrogen/propylene | molar ratio | 0.091 | 0.102 | 0.073 | 0.072 | — |
| Second reactor Production of propylene/ethylene random copolymer | Polymerization temperature | °C. | 80 | 80 | 80 | 80 | 65 |
|  | Average residence time | hr | 2.7 | 2.4 | 2.6 | 2.5 | 1.4 |
|  | Hydrogen/propylene | molar ratio | 0.0003 | 0.0013 | 0.0013 | 0.0028 | — |
|  | Ethylene/propylene | molar ratio | 0.40 | 0.33 | 0.28 | 0.52 | — |
|  | EtOH/TEA | molar ratio | 1.25 | 1.48 | 1.39 | 1.79 | — |
|  | Al concentration | ppm | 55.3 | 53.5 | 113.0 | 54.7 | — |
| $[\eta]p$ |  | dL/g | 0.88 | 0.86 | 0.98 | 0.98 | 0.89 |
| $[\eta]c$ |  | dL/g | 7.6 | 7.4 | 6.4 | 5.9 | 7.5 |
| $[\eta]c/[\eta]p$ |  | dL/g | 8.6 | 8.6 | 6.5 | 6.0 | 8.4 |
| Content of propylene/ethylene copolymer |  | wt % | 24 | 21 | 20 | 21 | 7.9 |
| Ethylene content of propylene/ethylene copolymer |  | wt % | 43 | 36 | 31 | 44 | 31 |
| MFR |  | g/10 min | 32 | 36 | 49 | 37 | 100 |
| Propylene/ethylene block copolymer |  |  | improver 5 | improver 6 | improver 7 | improver 8 | improver 9 |

Propylene/Ethylene Block Copolymer Production Example 1; the Copolymer being for Use as Polypropylene-Based Resin Material to be Modified Polymerization was conducted using an apparatus for continuous polymerization configured of two fluidized-bed reactors which each had a capacity of 2,000 L and which had been connected to each other. First, polymerization was conducted in the first reactor at a polymerization temperature of 65° C. and a partial propylene pressure of 1.8 MPa (absolute pressure) while continuously supplying hydrogen as a molecular weight regulator so as to result in a hydrogen/propylene molar ratio of 0.062 and while supplying triethylaluminum at 5.2 g/hr and supplying the catalyst 2 so as to result in a polymer polymerization rate of 20 kg/hr. The powder (crystalline propylene polymer) obtained through polymerization in the first reactor was continuously discharged at a discharge rate of 20 kg/hr so that the amount of the powder retained in the reactor was 60 kg, and was continuously transferred to the second reactor (first-stage polymerization step).

Polymerization in the second reactor was conducted at a polymerization temperature of 80° C. while continuously supplying propylene and ethylene in an ethylene/propylene molar ratio of 0.48 so as to result in a monomer pressure of 1.5 MPa and further continuously supplying hydrogen as a molecular weight regulator so as to result in a hydrogen/propylene molar ratio of 0.022. Furthermore, ethyl alcohol was supplied in an amount 2.0 times by mole the amount of the triethylaluminum supplied to the first reactor. The powder obtained through polymerization in the second reactor was continuously discharged and introduced into a vessel so that the amount of the powder retained in the reactor was 60 kg, and moisture-containing nitrogen gas was supplied thereto to terminate the reaction. Thus, a propylene/ethylene block copolymer was obtained (second-stage polymerization step). The propylene/ethylene block copolymer obtained was used as A-1.

Propylene/Ethylene Block Copolymer Production Example 2; the Copolymer being for Use as Polypropylene-Based Resin Material to be Modified The same procedure as in Production Example 10 was conducted, except that in the second reactor, ethylene and propylene were continuously supplied so as to result in an ethylene/propylene molar ratio of 0.57, hydrogen as a molecular weight regulator was continuously supplied so as to result in a hydrogen/propylene molar ratio of 0.030, and ethyl alcohol was supplied in an amount 1.38 times by mole the amount of the triethylaluminum supplied to the first reactor. Thus, a propylene/ethylene block copolymer was obtained. The propylene/ethylene block copolymer obtained was used as A-2.

Propylene/Ethylene Block Copolymer Production Example 3; the Copolymer being for Use as Polypropylene-Based Resin Material to be Modified The same procedure as in Production Example 10 was conducted, except that the polymerization temperature in the first reactor was changed to 75° C. and hydrogen as a molecular weight regulator was continuously supplied so as to result in a hydrogen/propylene molar ratio of 0.059, and that in the second reactor, ethylene and propylene were continuously supplied so as to result in an ethylene/propylene molar ratio of 0.47, hydrogen as a molecular weight regulator was continuously supplied so as to result in a hydrogen/propylene molar ratio of 0.016, and ethyl alcohol was supplied in an amount 1.20 times by mole the amount of the triethylaluminum supplied to the first reactor. Thus, a propylene/ethylene block copolymer was obtained. The propylene/ethylene block copolymer obtained was used as A-3.

Example 1

A polypropylene-based resin material to be modified was obtained as a material to be modified, by mixing A-1 as a propylene/ethylene block copolymer of component A, PC25RC (talc having an average particle diameter of 6 μm), manufactured by Nippon Talc Co., Ltd., as an inorganic filler of component B, and an ethylene/octene copolymer elastomer having a density of 0.870 g/cc (Engage 8100, manufactured by The Dow Chemical Co.) as an elastomer of component C, in the proportion shown in Table 3.

To 100 parts by weight of the material to be modified were added 10 parts by weight of appearance improver 1, 0.1 part by weight of tetrakis[methylene-3-(3',5'-di-t-butyl-4'-dyhydroxyphenyl)propionato]methane (trade name, Irganox 1010; manufactured by BASF A.G), and 0.05 parts by weight of tris(2,4-di-t-butylphenyl) phosphite (trade name, Irgafos 168; manufactured by BASF A.G). The ingredients were mixed for 5 minutes using a Henschel mixer and then kneaded and pelletized with a twin-screw kneading machine (KCM, manufactured by Kobe Steel, Ltd.) at a set temperature of 210° C., thereby obtaining a polypropylene-based resin composition.

The results of evaluation of the polypropylene-based resin composition obtained are shown in Table 3.

Examples 2 to 6

The same procedure as in Example 1 was conducted, except that appearance improver 2 to appearance improver 6 (Examples 2 to 6) were used in place of the appearance improver 1. Thus, polypropylene-based resin compositions were obtained. The results of evaluation of the polypropylene-based resin compositions obtained are shown in Table 3.

Examples 7 and 8

The same procedure as in Example 1 was conducted, except that propylene-ethylene block copolymer (A-2) was used in place of the propylene/ethylene block copolymer (A-1), and the materials to be modified were used in the proportions shown in Table 3. Thus, polypropylene-based resin compositions were obtained. The results of evaluation of the polypropylene-based resin compositions obtained are shown in Table 3.

Examples 9 and 10

The same procedure as in Example 1 was conducted, except that propylene/ethylene block copolymer (A-3) was used in place of the propylene/ethylene block copolymer (A-1) and an ethylene/butene copolymer elastomer having a density of 0.862 g/cc (Tafmer A4050S, manufactured by Mitsui Chemicals, Inc.) was used as an elastomer of component C, and the materials to be modified were used in the proportions shown in Table 3. Thus, polypropylene-based resin compositions were obtained. The results of evaluation of the polypropylene-based resin compositions obtained are shown in Table 3.

Example 11

The same procedure as in Example 1 was conducted, except that propylene/ethylene block copolymer (A-2) was used in place of the propylene/ethylene block copolymer (A-1) and appearance improver 4 was used in place of the appearance improver 1, and the material to be modified was used in the proportion shown in Table 3. Thus, a polypropylene-based resin composition was obtained. The results of evaluation of the polypropylene-based resin composition obtained are shown in Table 3.

Comparative Examples 1 and 2

The same procedure as in Example 1 was conducted, except that appearance improver 7 and appearance improver 8 were used in place of the appearance improver 1. Thus, polypropylene-based resin compositions were obtained. The results of evaluation of the polypropylene-based resin compositions obtained are shown in Table 3.

Comparative Example 3

The same procedure as in Example 1 was conducted, except that appearance improver 9 was used in place of the appearance improver 1 and propylene/ethylene block copolymer (A-2) was used in place of the propylene/ethylene block copolymer (A-1). Thus, a polypropylene-based resin composition was obtained. The results of evaluation of the polypropylene-based resin composition obtained are shown in Table 3.

Comparative Example 4

The same procedure as in Example 1 was conducted, except that no appearance improver was used and an ethylene/butene copolymer elastomer having a density of 0.862 g/cc (Tafmer A1050S, manufactured by Mitsui Chemicals, Inc.) was used as an elastomer of component C, and the material to be modified was used in the proportion shown in Table 3. Thus, a polypropylene-based resin composition was obtained. The results of evaluation of the polypropylene-based resin composition obtained are shown in Table 3.

Comparative Example 2 showed a short distance to flow marks.

(4) Comparative Example 3 is an example in which the proportion of the propylene/ethylene random copolymer part is low. As compared with Examples 1 to 11, Comparative Example 3 showed a short distance to flow marks.

TABLE 3

|  | Appearance improver | | Polypropylene-based resin material to be modified | | | MFR (poly-propylene-based resin composition) | Appearance | | Property | | |
|  |  |  | Component (A) Propylene/ethylene block copolymer | | Component (B) Inorganic filler | Component (C) Elastomer |  | Distance to flow mark | | Brittleness temperature | | Overall evaluation |
|  | Kind | Parts by weight | Kind | wt % | wt % | wt % |  | g/10 min | mm | Rating | ° C. | Rating |  |
| Example 1 | improver 1 | 10 | A-1 | 55 | 25 | 20 | 35.4 | 180 | good | −21.5 | good | good |
| Example 2 | improver 2 | 10 | A-1 | 55 | 25 | 20 | 35.4 | 180 | good | −21.5 | good | good |
| Example 3 | improver 3 | 10 | A-1 | 55 | 25 | 20 | 35.4 | 185 | excellent | −21.5 | good | excellent |
| Example 4 | improver 4 | 10 | A-1 | 55 | 25 | 20 | 32.6 | 195 | excellent | −24.5 | good | excellent |
| Example 5 | improver 5 | 10 | A-1 | 55 | 25 | 20 | 36.3 | 205 | excellent | −23.5 | good | excellent |
| Example 6 | improver 6 | 10 | A-1 | 55 | 25 | 20 | 36.3 | 200 | excellent | −19.0 | good | excellent |
| Example 7 | improver 1 | 10 | A-2 | 65 | 20 | 15 | 24.6 | 200 | excellent | −23.5 | good | excellent |
| Example 8 | improver 1 | 7 | A-2 | 72 | 17 | 11 | 27.6 | 180 | good | −21.0 | good | good |
| Example 9 | improver 1 | 10 | A-3 | 50 | 30 | 20 | 24.2 | 175 | good | −19.0 | good | good |
| Example 10 | improver 1 | 5 | A-3 | 72 | 10 | 18 | 29.9 | 180 | good | −24.0 | good | good |
| Example 11 | improver 4 | 13.5 | A-2 | 75 | 25 | 0 | 34.6 | 185 | excellent | −4.0 | poor | acceptable |
| Comparative Example 1 | improver 7 | 10 | A-1 | 55 | 25 | 20 | 36.3 | 160 | poor | −16.0 | poor | very poor |
| Comparative Example 2 | improver 8 | 10 | A-1 | 55 | 25 | 20 | 36.3 | 145 | poor | −21.5 | good | poor |
| Comparative Example 3 | improver 9 | 10 | A-2 | 55 | 25 | 20 | 26.5 | 150 | poor | −32.5 | good | poor |
| Comparative Example 4 | — | 0 | A-1 | 60 | 21 | 19 | 45 | 120 | poor | −19.0 | good | poor |

The following became clear from the Examples and Comparative Examples given above.

(1) Examples 1 to 11 are examples concerning appearance improvers for polypropylene-based resins, the appearance improvers each including a propylene/ethylene block copolymer in which the ratio ($[\eta]c/[\eta]p$) of the intrinsic viscosity $[\eta]c$ of the propylene/ethylene random copolymer portion to the intrinsic viscosity $[\eta]p$ of the crystalline propylene polymer portion is exceedingly high and in which the propylene/ethylene random copolymer, which has a high intrinsic viscosity $[\eta]c$, is contained in a high proportion. As compared with Comparative Examples 1 to 4, Examples 1 to 11 attained longer distances to flow marks. Consequently, the Examples were satisfactory also in terms of overall evaluation.

(2) Comparative Example 1 is an example in which the propylene/ethylene random copolymer part has a low intrinsic viscosity $[\eta]c$ and a low ethylene content. As compared with Examples 1 to 11, Comparative Example 1 showed a short distance to flow marks and a high brittleness temperature.

(3) Comparative Example 2 is an example in which the propylene/ethylene random copolymer part has a low intrinsic viscosity $[\eta]c$. As compared with Examples 1 to 11, (5) Comparative Example 4 is an example in which no appearance improver has been added. As compared with Examples 1 to 11, Comparative Example 4 showed a short distance to flow marks.

INDUSTRIAL APPLICABILITY

The propylene-based block copolymer and polypropylene pellets of the invention are thought to be utilizable in such a manner that the block copolymer is incorporated as a raw material or the pellets are added as an appearance improver, for the purpose of improving or eliminating flow-mark molding defects when molded articles having a shape which is prone to result in flow-mark molding defects are molded or when molded articles are molded under conditions which are prone to result in flow-mark molding defects.

While the invention has been described in detail and with reference to specific embodiments thereof, it will be apparent to one skilled in the art that various changes and modifications can be made therein without departing from the spirit and scope thereof. This application is based on a Japanese patent application filed on Jun. 20, 2013 (Application No. 2013-129827), the entire contents thereof being incorporated herein by reference.

The invention claimed is:

1. A propylene-based block copolymer, comprising:
65 to 80% by weight of crystalline propylene polymer portion; and
20 to 35% by weight of propylene/ethylene random copolymer portion, wherein the propylene-based block copolymer satisfies the following requirements (a) to (e):
(a) the crystalline propylene polymer portion has an intrinsic viscosity [η]p of 0.75 to 0.90 dL/g;
(b) the propylene/ethylene random copolymer portion has an intrinsic viscosity [η]c of 7.0 to 15 dL/g;
(c) the propylene/ethylene random copolymer portion has an ethylene content of 35 to 50% by weight;
(d) a ratio ([η]c/[η]p) of the intrinsic viscosity [η]c of the propylene/ethylene random copolymer portion to the intrinsic viscosity [η]p of the crystalline propylene polymer portion is 8 to 30; and
(e) the propylene-based block copolymer has a MFR of 20 to 50 g/10 min.

2. A polypropylene-based resin composition obtained by mixing 100 parts by weight of a polypropylene-based resin material to be modified, with 2 to 30 parts by weight of the propylene-based block copolymer according to claim 1.

3. The polypropylene-based resin composition according to claim 2, wherein the polypropylene-based resin material to be modified comprises (A) 40 to 98% by weight of a propylene/ethylene block copolymer, (B) 1 to 35% by weight of an inorganic filler, and (C) 1 to 30% by weight of an elastomer.

4. A molded object obtained by injection-molding the polypropylene-based resin composition according to claim 2.

5. A molded object obtained by injection-molding the polypropylene-based resin composition according to claim 3.

* * * * *